(12) United States Patent
Kuramatsu

(10) Patent No.: US 9,594,432 B2
(45) Date of Patent: Mar. 14, 2017

(54) ELECTRONIC DEVICE, CONTROL SETTING METHOD AND PROGRAM

(75) Inventor: Hiroyasu Kuramatsu, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 13/985,976

(22) PCT Filed: Dec. 16, 2011

(86) PCT No.: PCT/JP2011/007054
§ 371 (c)(1),
(2), (4) Date: Aug. 16, 2013

(87) PCT Pub. No.: WO2012/111060
PCT Pub. Date: Aug. 23, 2012

(65) Prior Publication Data
US 2013/0321319 A1    Dec. 5, 2013

(30) Foreign Application Priority Data
Feb. 18, 2011   (JP) .................. 2011-033781

(51) Int. Cl.
*G06F 3/01*    (2006.01)
*G06F 3/0488*  (2013.01)

(52) U.S. Cl.
CPC .......... *G06F 3/017* (2013.01); *G06F 3/04883* (2013.01); *G06F 2203/04808* (2013.01)

(58) Field of Classification Search
CPC .... G06F 3/0488; G06F 3/04883; G06F 3/017; G06F 2203/04808
See application file for complete search history.

(56) References Cited

U.S. PATENT DOCUMENTS

2002/0036618 A1    3/2002  Wakai et al.
2007/0247441 A1*  10/2007  Kim et al. ................... 345/173
2008/0036743 A1    2/2008  Westerman et al.
(Continued)

FOREIGN PATENT DOCUMENTS

EP    1 942 401 A1   7/2008
EP    2 169 529 A2   3/2010
(Continued)

OTHER PUBLICATIONS

International Search Report for PCT/JP2011/007054 dated Mar. 19, 2012.
(Continued)

*Primary Examiner* — Lixi C Simpson
(74) *Attorney, Agent, or Firm* — Sughrue Mion, PLLC

(57) ABSTRACT

An electronic device includes a touch position receiving unit which receives from a touch panel, touch position information indicating each of touch positions of a first object and at least one of second objects with respect to the touch panel for each object, the second object being different from the first object, a change type setting unit which calculates a movement direction of each of the first object and the second object based on the touch position information, and determines a change type of a display of the touch panel based on the movement direction, and a change amount setting unit which recognizes the number of the second objects based on the touch position information, and determines a change amount of the display based on the number.

21 Claims, 18 Drawing Sheets

(56) References Cited

U.S. PATENT DOCUMENTS

| | | | |
|---|---|---|---|
| 2008/0062141 A1 | 3/2008 | Chandhri | |
| 2008/0309632 A1* | 12/2008 | Westerman et al. | 345/173 |
| 2009/0227295 A1 | 9/2009 | Kim | |
| 2010/0079501 A1* | 4/2010 | Ikeda et al. | 345/661 |
| 2010/0149109 A1* | 6/2010 | Elias | 345/173 |
| 2010/0162181 A1* | 6/2010 | Shiplacoff et al. | 715/863 |
| 2010/0214322 A1 | 8/2010 | Lim et al. | |
| 2011/0285649 A1* | 11/2011 | Ogawa et al. | 345/173 |

FOREIGN PATENT DOCUMENTS

| | | |
|---|---|---|
| JP | 2001-290585 A | 10/2001 |
| JP | 2009-217816 A | 9/2009 |
| JP | 2010-108011 A | 5/2010 |
| JP | 2010-517197 A | 5/2010 |

OTHER PUBLICATIONS

Communication dated Sep. 1, 2015 from the Japanese Patent Office in counterpart application No. 2012-557672.

Communication dated Oct. 5, 2016, from the European Patent Office in counterpart European application No. 11858964.7.

\* cited by examiner

FIG. 10
(a)
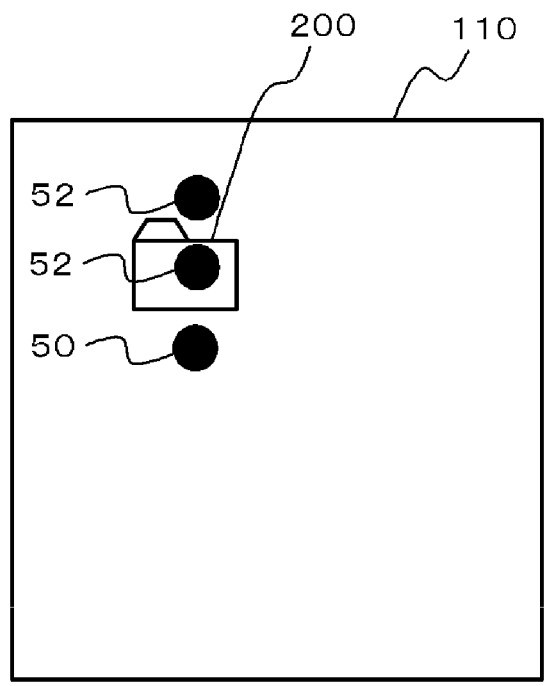
(b)
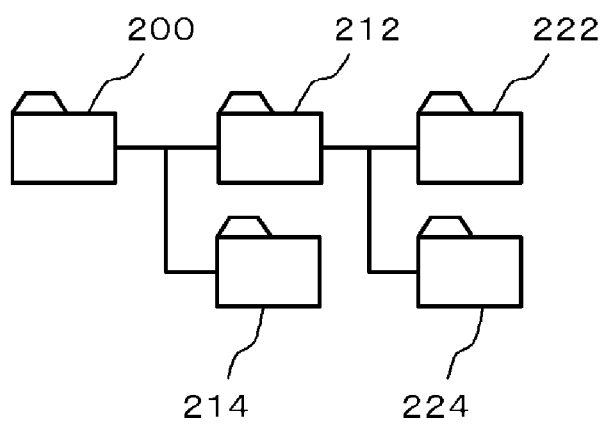

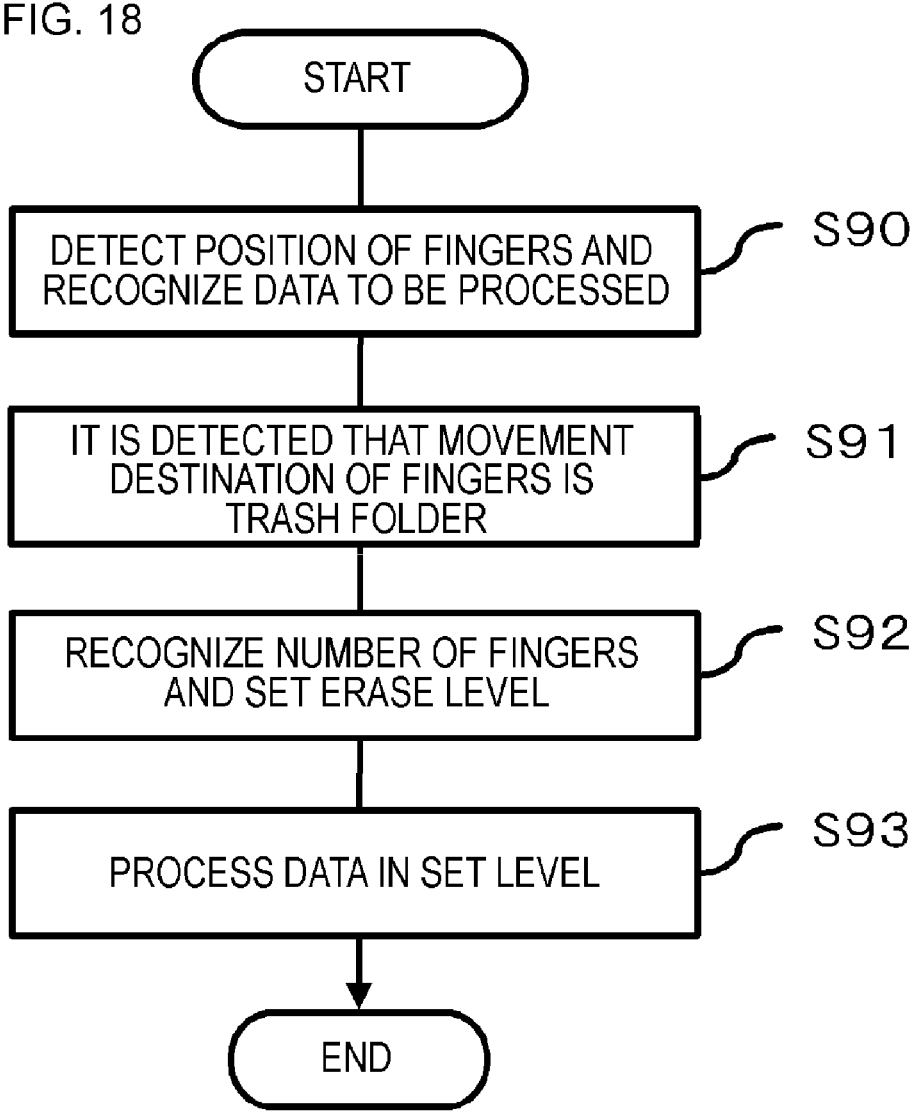

ELECTRONIC DEVICE, CONTROL SETTING METHOD AND PROGRAM

CROSS REFERENCE TO RELATED APPLICATIONS

This application is a National Stage of International Application No. PCT/JP2011/007054 filed Dec. 16, 2011, claiming priority based on Japanese Patent Application No. 2011-033781 filed Feb. 18, 2011, the contents of all of which are incorporated herein by reference in their entirety.

TECHNICAL FIELD

The present invention relates to an electronic device which performs a control of a touch panel, a control setting method and a program.

BACKGROUND ART

As an electronic device has more functions, it is desirable to improve a user interface. For example, as described in Patent document 1, the electronic device detects that a plurality of fingers simultaneously touches a touch panel, whereby determines gestures of the plurality of fingers, and the gestures are treated as inputs to the electronic device.

RELATED DOCUMENT

Patent Document

[Patent Document 1] PCT Japanese Translation Patent Publication No. 2010-517197

DISCLOSURE OF THE INVENTION

According to a technology described in Patent Document 1, the gestures of a plurality of fingers can be treated as inputs to the electronic device. On the other hand, it is desirable to further improve the inputs of gestures in order to enhance convenience.

An object of the present invention is to enhance convenience of a user interface in an electronic device with a touch panel.

According to the present invention, there is provided an electronic device including a touch position receiving unit which receives for each object from a touch panel, touch position information indicating each of touch positions of a first object and at least one of second objects with respect to the touch panel, the second object being different from the first object, a change type setting unit which calculates a movement direction of each of the first object and the second object based on the touch position information, and determines a change type of a display of the touch panel based on the movement direction, and a change amount setting unit which recognizes the number of the second objects based on the touch position information, and determines a change amount of the display based on the number.

According to the present invention, there is provided a control setting method of a display of a touch panel which is implemented by a computer including receiving from a touch panel, touch position information indicating each of touch positions of a first object and at least one of second objects with respect to the touch panel for each object, the second object being different from the first object, calculating a movement direction of each of the first object and the second object based on the touch position information, and determining a change type of a display of the touch panel based on the movement direction, and recognizing the number of the second objects based on the touch position information, and determining a change amount of the display based on the number.

According to the present invention, there is provided a program which causes a computer to function as an electronic device which controls a display of a touch panel, the program causing the computer to realize a function of receiving, from a touch panel, touch position information indicating each of touch positions of a first object and at least one of second objects with respect to the touch panel for each object, the second object being different from the first object, a function of calculating a movement direction of each of the first object and the second object based on the touch position information, and determining a change type of a display of the touch panel based on the movement direction, and a function of recognizing the number of the second objects based on the touch position information, and determining a change amount of the display based on the number.

According to the present invention, it is possible to enhance convenience of user interface in an electronic device with a touch panel.

BRIEF DESCRIPTION OF THE DRAWINGS

These and other objects, features, and advantages of the invention will be apparent through reference to the description of preferred exemplary embodiments and accompanying drawings.

FIG. 10 is a schematic diagram illustrating a fifth example of the control that the change type setting unit and the change amount setting unit perform.

FIG. 18 is a flow chart illustrating the details of the process shown in FIG. 17.

DESCRIPTION OF EMBODIMENTS

Figure 1:
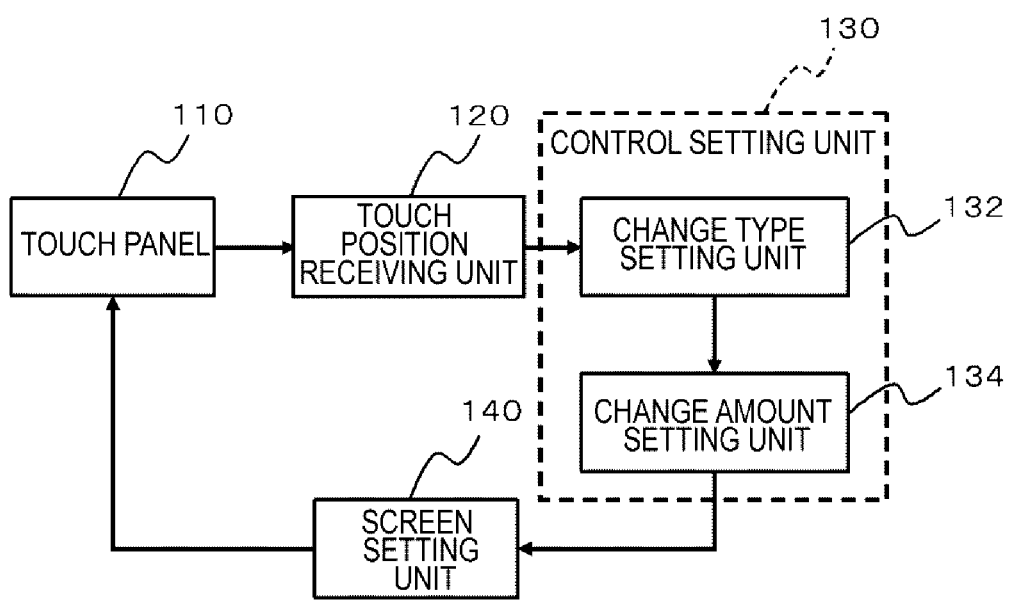
FIG. 1 is a block diagram illustrating a configuration of an electronic device relating to a first exemplary embodiment.

Hereinafter, embodiments of the present invention will be described referring to accompanying drawings. Further, in the drawings, the same components are denoted by the same reference numerals, therefore the description thereof will not be repeated.

First Exemplary Embodiment

FIG. 1 is a block diagram illustrating a configuration of an electronic device of a first exemplary embodiment. The electronic device is for example, a portable communication device, and includes a touch position receiving unit 120 and a control setting unit 130. The touch position receiving unit 120 receives touch position information indicating touch positions of objects (for example, fingers) to a touch panel 110, for each object, from the touch panel 110 of the electronic device. The control setting unit 130 determines a control over the electronic device, based on the number of the objects (fingers) and the direction of the movement of the objects. The touch position receiving unit 120 and the control setting unit 130 constitute an electronic device of the present invention. In addition, the electronic device includes a touch panel 110 that is subject to control. However, the touch panel 110, which is a target of the control, may be separated from the electronic device. Hereinafter, a description will be made under an assumption that the objects touching the touch panel 110 are fingers.

In the present exemplary embodiment, the touch position receiving unit 120 calculates the movement direction and the movement velocity of each finger. The calculated movement direction and movement velocity has both a component of an x direction and a component of a y direction. Using the movement direction and the movement velocity that the touch position receiving unit 120 calculates, the control setting unit 130 performs a process described later.

In the present exemplary embodiment, the control setting unit 130 includes a change type setting unit 132 and a change amount setting unit 134. The change type setting unit 132 determines a change type of a screen that has to be displayed on the touch panel 110, based on the movement direction of the position of fingers. The change amount setting unit 134 determines a change amount in the change type that is set by the change type setting unit 132, based on the number of fingers.

Here, the change type setting unit 132 determines a change type based on a change in a relative position of a second finger to a first finger that is calculated based on touch position information corresponding to the first finger (first object) and touch position information corresponding to the second finger (second object). The change type setting unit 132 determines a change in a relative position among a plurality of fingers, for example, in the following manner. First, the change type setting unit 132 determines, with respect to each finger, which one is larger between the x direction component and the y direction component of the movement velocity. In a case where the user intends to perform an operation to the touch panel 110 by moving a plurality of fingers, among the x direction components and the y direction components of the movement velocities of the plurality of fingers, the same direction components are definitely larger than the different direction components. By using this fact, the change type setting unit 132 selects larger component out of the x direction component and the y direction component of the movement velocity of the finger. Then, the change type setting unit 132 determines, with respect to the movement direction of each finger, whether a plurality of fingers moves in the same direction or any one finger moves in the direction opposite to other fingers, using the direction of the selected component (any one of x direction and y direction).

Note that, the change type setting unit 132 may determine whether or not the plurality of fingers moves in the same direction using other methods.

Further, the change amount setting unit 134 may determine the change amount based on the number of the second fingers in a case where the number of the first finger is one, the number of the second finger is one or plural, and a plurality of second fingers move in the same direction. Further, the change amount setting unit 134 may determine the change amount using the change amount of the relative positions of the first finger and the second finger. Here, for example, the first finger is a thumb, and the second finger is one of the other fingers.

Further, in the present exemplary embodiment, the electronic device includes a screen setting unit 140. The screen setting unit 140 sets a screen to be displayed on the touch panel 110. The screen setting unit 140 changes the screen to be displayed on the touch panel 110 according to a method that the control setting unit 130 sets.

In addition, the touch position receiving unit 120, the control setting unit 130, and the screen setting unit 140, which are shown in FIG. 1, are not described as configurations in a unit of hardware, but as blocks in a functional unit. The touch position receiving unit 120, the control setting unit 130, and the screen setting unit 140 are implemented with any combination of software and hardware, that is, mainly a CPU of a computer, a memory, a program loaded on the memory for implementing components in the drawings, a memory unit such as a hard disk for storing the program, and an interface for network connection. Then, various modification examples of the realizing method and apparatus are present.

Figure 2:
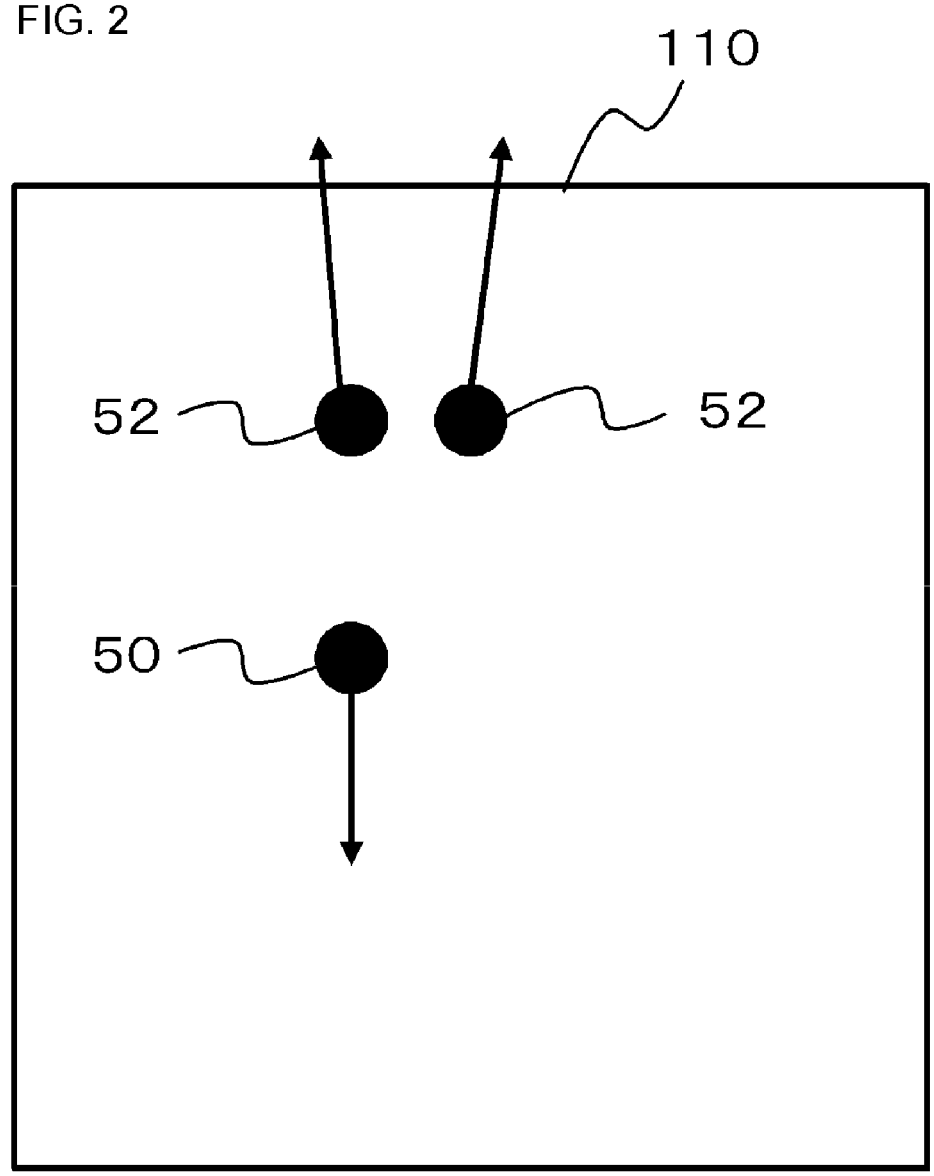
FIG. 2 is a schematic diagram illustrating a first example of a control that the change type setting unit and the change amount setting unit perform.

FIG. 2 is a schematic diagram illustrating a first example of a control that is performed by the change type setting unit 132 and the change amount setting unit 134. The process shown in the drawings describes an operation for enlarging the screen displayed on the touch panel 110. When the user of the electronic device wants to enlarge the screen, the user moves the thumb 50 and other fingers 52 (for example, an index finger and a middle finger) in a direction away from each other. The control setting unit 130 enlarges the screen displayed on the touch panel 110 in a case where such operations are performed on the touch panel 110.

Figure 3:
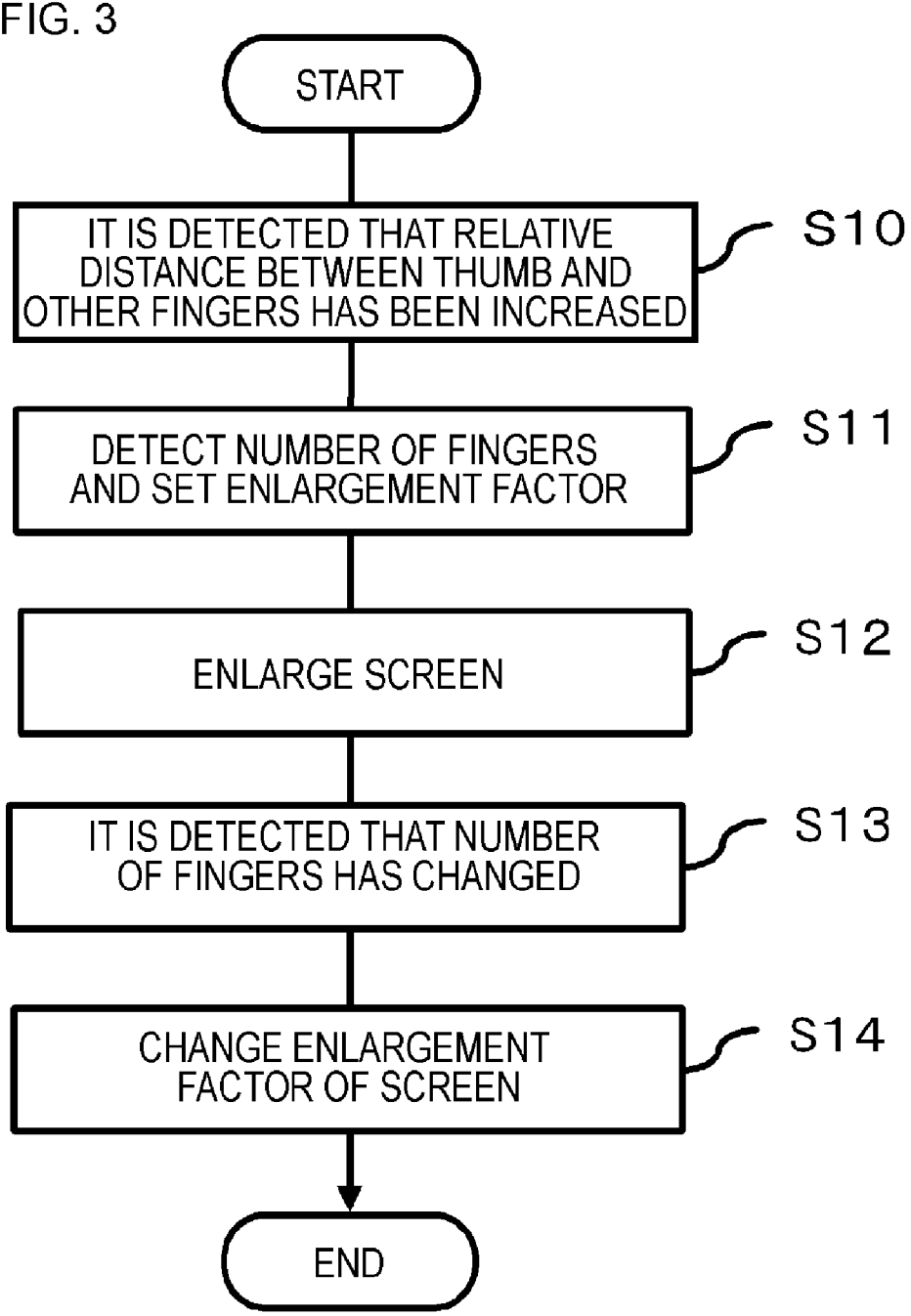
FIG. 3 is a flow chart illustrating the details of the process shown in FIG. 2.

FIG. 3 is a flow chart illustrating the details of the process shown in FIG. 2. First, the change type setting unit 132 detects that the relative distance between the thumb 50 and other fingers 52 has been increased (step S10). Therefore, the change typesetting unit 132 selects a process to enlarge the screen, as a screen change type. Next, the change amount setting unit 134 recognizes the total number of the thumb 50 and other fingers 52, and sets an enlargement factor according to the recognized number. Specifically, the larger the recognized number is, the larger the change amount setting unit 134 sets the enlargement factor to be. For example, the change amount setting unit 134 sets the enlargement factor to 200% in a case where the number of the fingers is two, and the change amount setting unit 134 sets the enlargement factor to 300%, in a case where the number of the fingers is three (step S11).

Next, the screen setting unit 140 enlarges and displays the screen according to the enlargement factor that is set by the change amount setting unit 134 (step S12). In this case, a center point of the enlargement process may be a center point among the thumb 50 and other fingers 52.

Then, in a case where the number of fingers touching the touch panel 110 is changed to a number other than 0 (step S13), the change type setting unit 132 changes the enlargement factor according to the changed number. The screen setting unit 140 causes the screen to be displayed according to the enlargement factor that is changed by the change amount setting unit 134 (step S14). For example, in a case where the number of fingers touching the touch panel 110 is changed from three to two, the enlargement factor of the screen is reduced from 300% to 200%.

Figure 4:
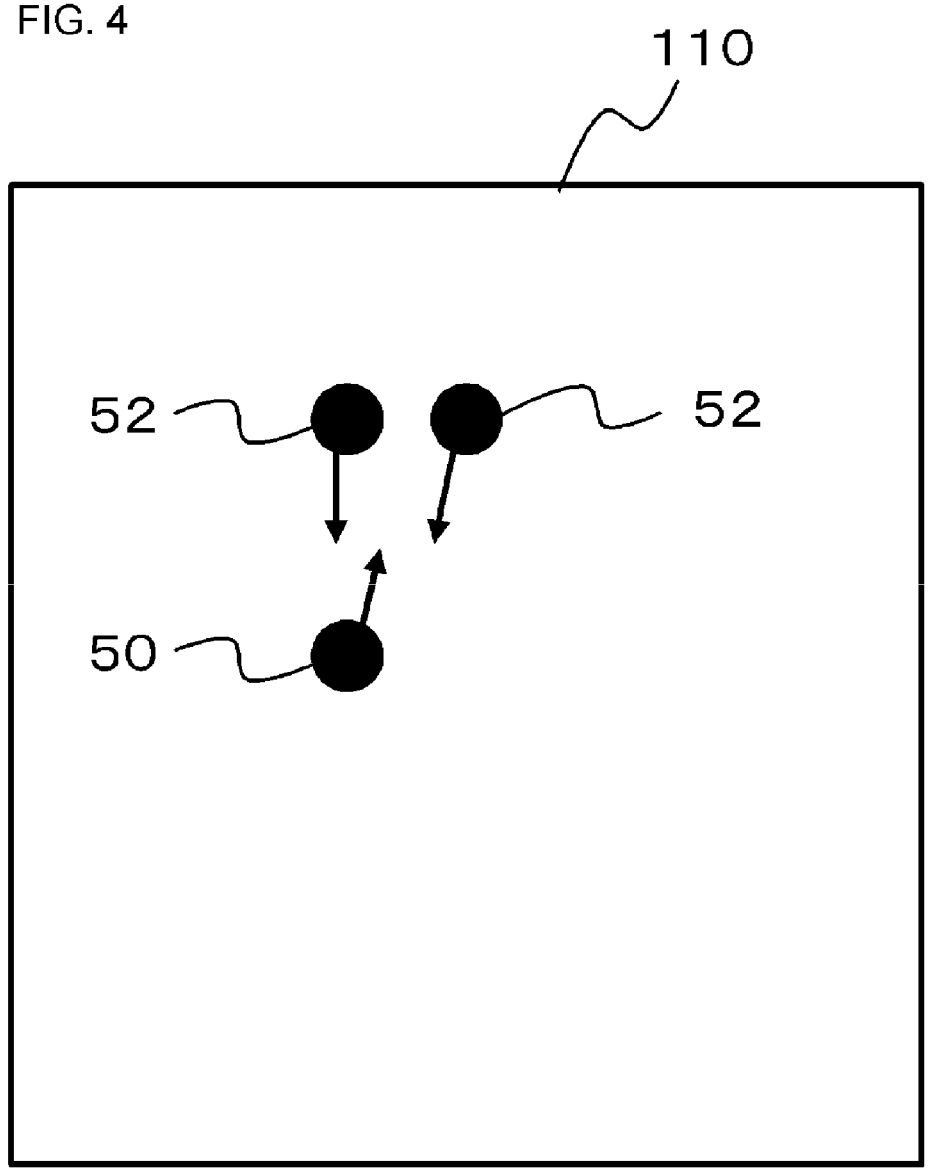
FIG. 4 is a schematic diagram illustrating a second example of the control that the change type setting unit and the change amount setting unit perform.

FIG. 4 is a schematic diagram illustrating a second example of the control that is performed by the change type setting unit 132 and the change amount setting unit 134. The process shown in the drawings is an operation for shrinking the screen displayed on the touch panel 110. When the user of the electronic device wants to shrink the screen, the user moves the thumb 50 and other fingers 52 (for example, an index finger and a middle finger) in a direction to be close to each other. The control setting unit 130 shrinks the screen displayed on the touch panel 110 in a case where such operations are performed on the touch panel 110.

Figure 5:
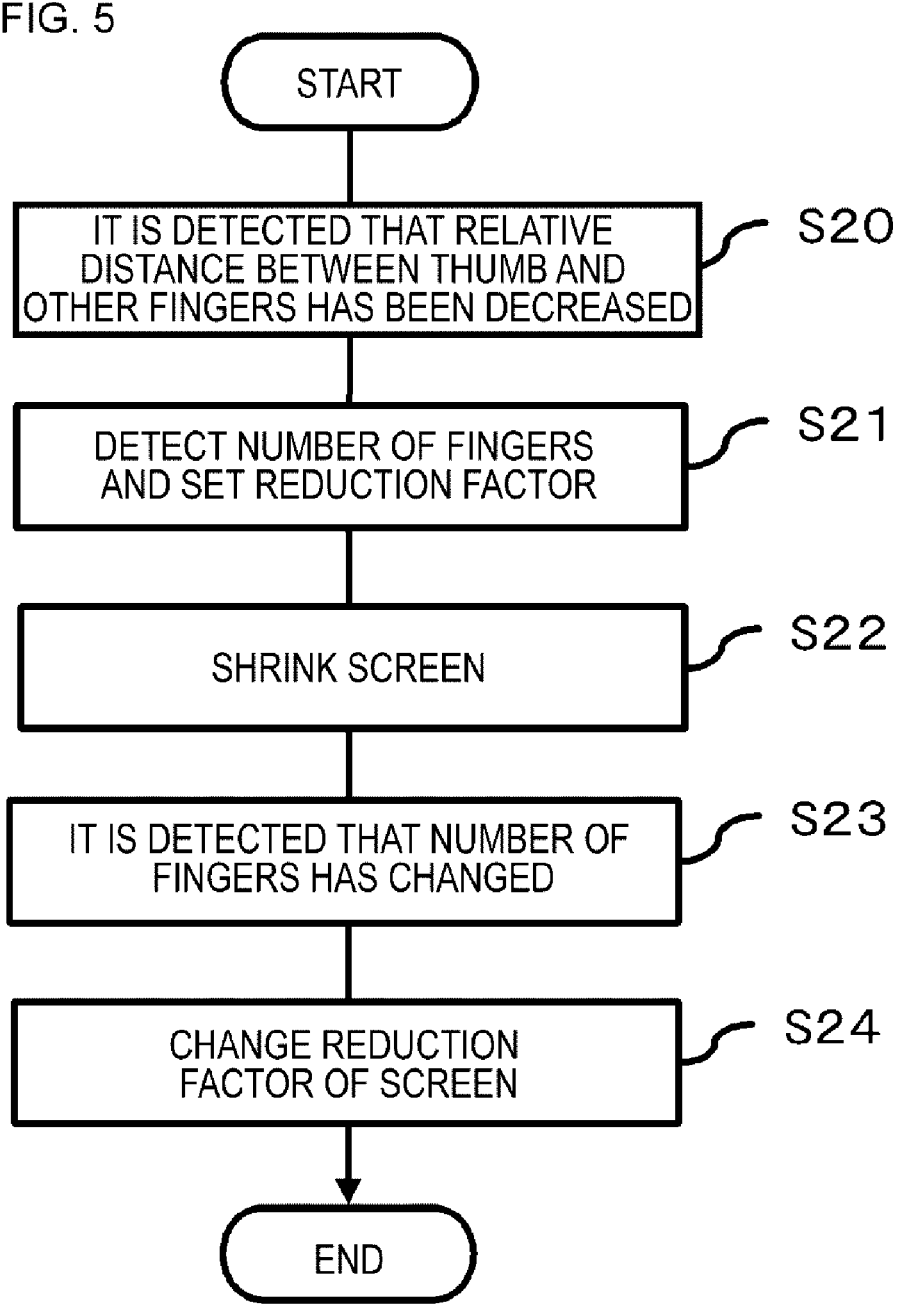
FIG. 5 is a flow chart illustrating the details of the process shown in FIG. 4.

FIG. 5 is a flow chart illustrating the details of the process shown in FIG. 4. First, the change type setting unit 132 detects that the relative distance between the thumb 50 and other fingers 52 has been decreased (step S20). Therefore, the change typesetting unit 132 selects a process to shrink the screen, as a screen change type. Next, the change amount setting unit 134 recognizes the total number of the thumb 50 and other fingers 52, and sets a shrink factor according to the recognized number. Specifically, the smaller the recognized number is, the smaller the change amount setting unit 134 sets the reduction factor to be. For example, the change amount setting unit 134 sets the shrink factor to ½ (that is, 50%) in a case where the number of the fingers is two, and the change amount setting unit 134 sets the shrink factor to ⅓ (that is, 33%), in a case where the number of the fingers is three (step S21).

Next, the screen setting unit 140 shrinks and displays the screen according to the shrink factor that is set by the change amount setting unit 134 (step S22). In this case, a center point of the shrink process may be a center point among the thumb 50 and other fingers 52.

Then, in a case where the number of fingers touching the touch panel 110 is changed to a number other than 0 (step S23), the change type setting unit 132 changes the shrink factor according to the changed number. The screen setting unit 140 causes the screen to be displayed according to the shrink factor that is changed by the change amount setting unit 134 (step S24). For example, in a case where the number of fingers touching the touch panel 110 is changed from three to two, the screen is changed from the shrink factor of 33% to the shrink factor of 50%. That is, the reduction of the number of fingers results in the enlarging of the screen.

Figure 6:
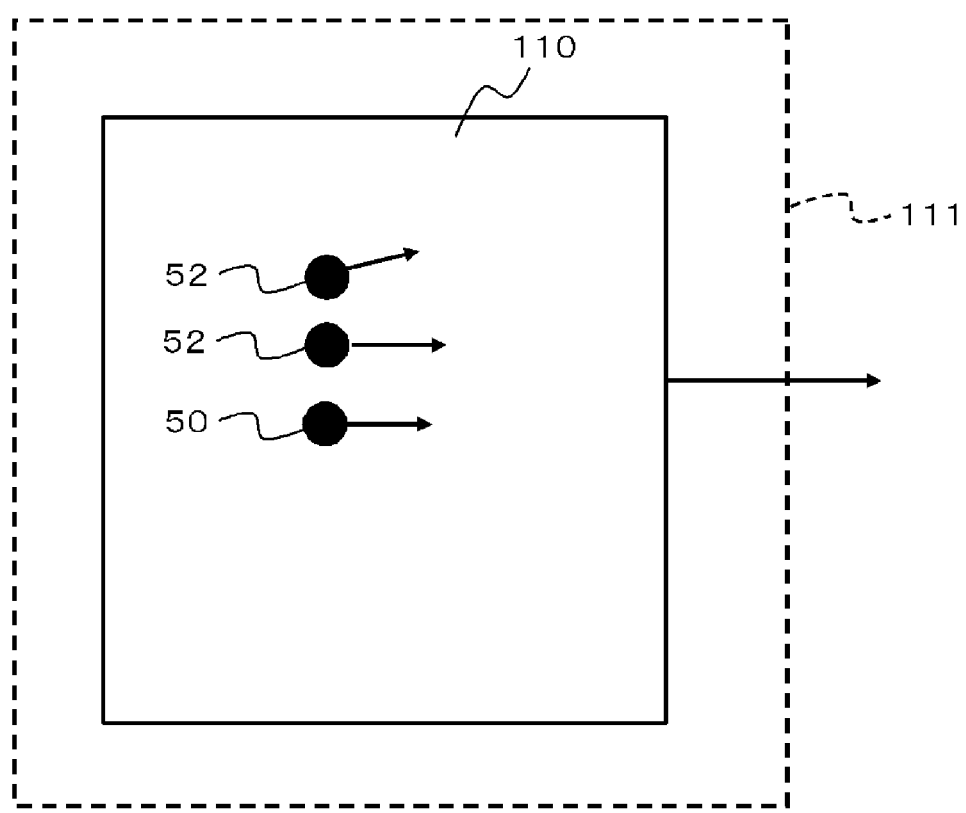
FIG. 6 is a schematic diagram illustrating a third example of the control that the change type setting unit and the change amount setting unit perform.

FIG. 6 is a schematic diagram illustrating a third example of the control that is performed by the change type setting unit 132 and the change amount setting unit 134. In this figure, the screen 111 to be displayed is larger than the 110. Then, the process shown in the drawing is an operation for scrolling the screen displayed on the touch panel 110. In a case of intending to scroll the screen, the user of the electronic device moves the thumb 50 and other fingers 52 (for example, an index finger and a middle finger) in the same direction. In a case where such operation is performed on the touch panel 110, the control setting unit 130 causes the screen displayed on the touch panel 110 to scroll in the movement direction of the thumb 50 and other fingers 52.

Figure 7:
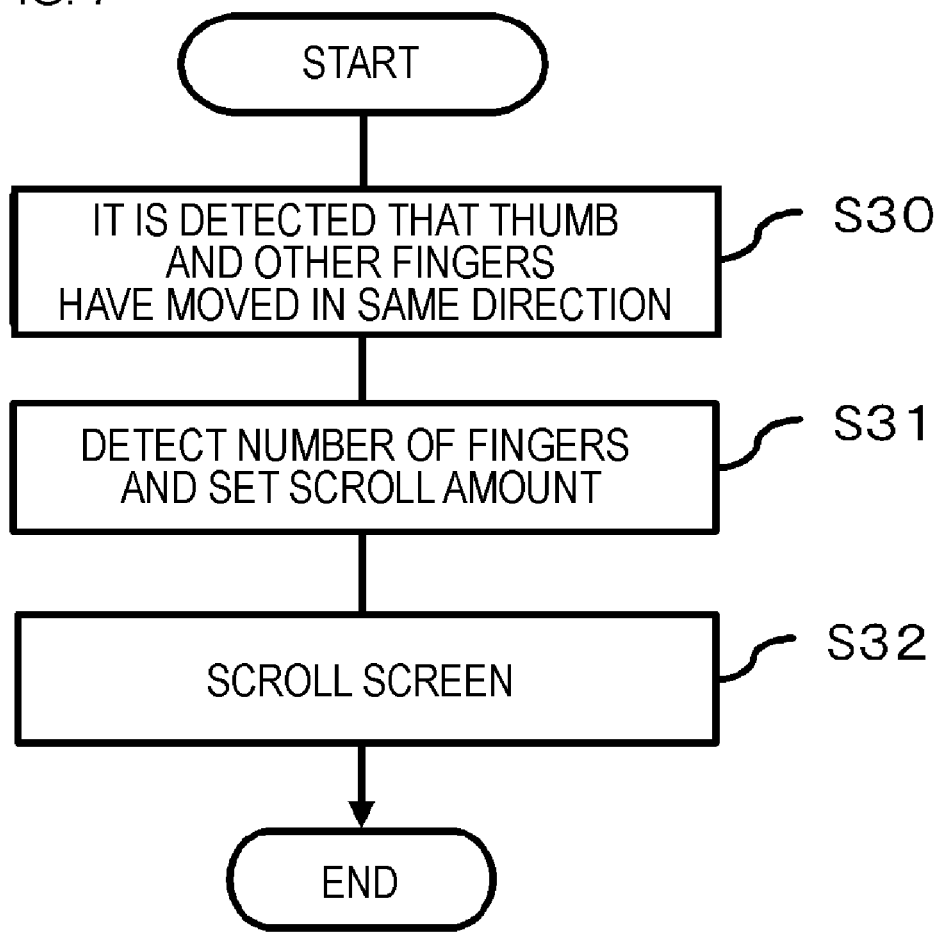
FIG. 7 is a flow chart illustrating the details of the process shown in FIG. 6.

FIG. 7 is a flow chart illustrating the details of the process shown in FIG. 6. First, the change type setting unit 132 detects that the thumb 50 and other fingers 52 have moved in the same direction (step S30). Therefore, the change type setting unit 132 selects a process to scroll the screen, as a screen change type. Next, the change amount setting unit 134 recognizes the total number of the thumb 50 and other fingers 52, and sets a scroll amount according to the recognized number (step S31). Specifically, the larger the recognized number is, the larger the change amount setting unit 134 sets the scroll amount to be. For example, the change amount setting unit 134 sets the scroll amount such that the screen is scrolled by approximately double the displayable width of the touch panel 110 in a case where the number of the fingers is two, and the change amount setting unit 134 sets the scroll amount such that the screen is scrolled by approximately triple the displayable width of the touch panel 110 in a case where the number of the fingers is three.

Next, the screen setting unit 140 causes the screen to be scrolled according to the scroll amount that is set by the change amount setting unit 134 (step S32).

Figure 8:
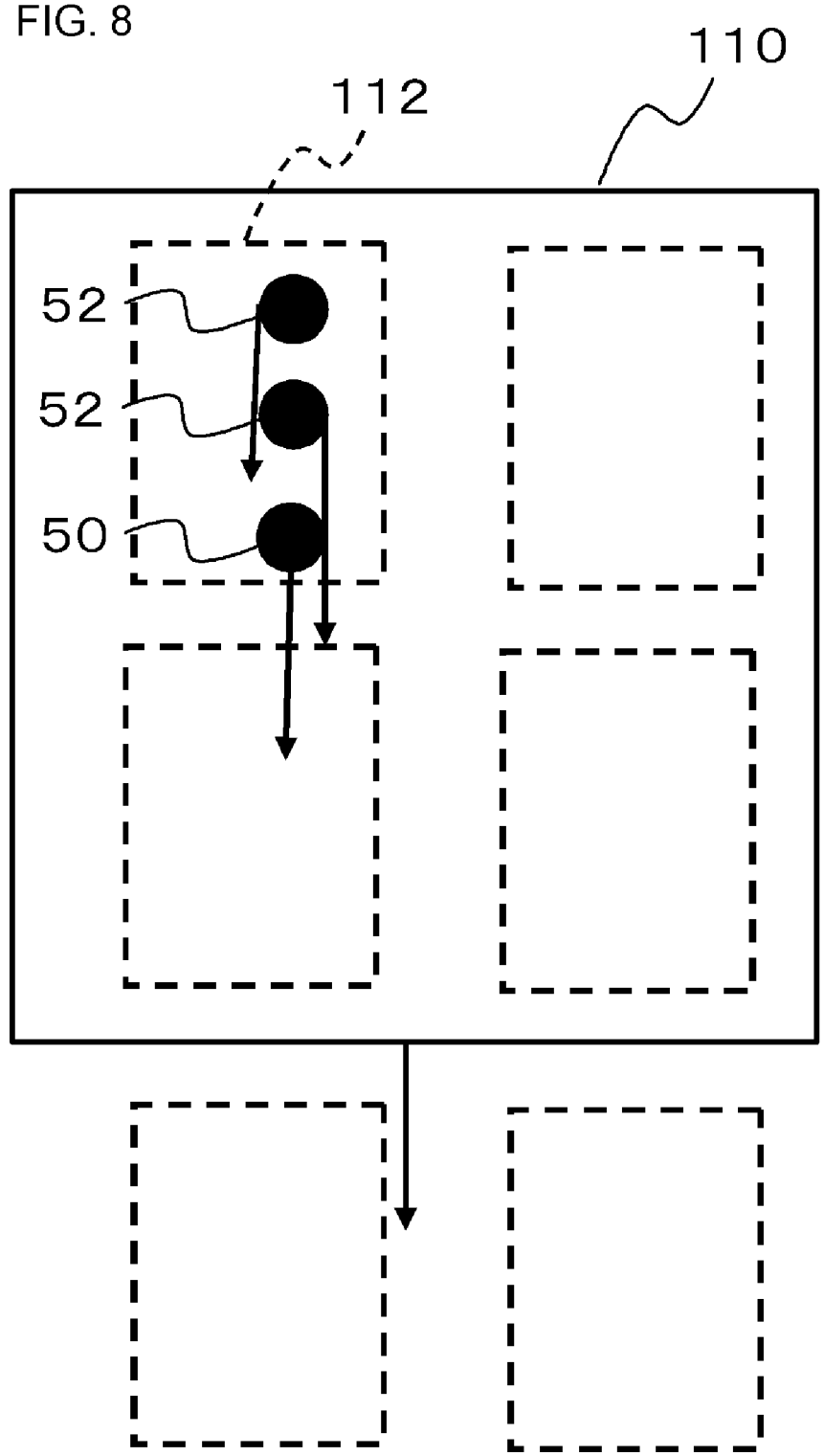
FIG. 8 is a schematic diagram illustrating a fourth example of the control that the change type setting unit and the change amount setting unit perform.

FIG. 8 is a schematic diagram illustrating a fourth example of the control that is performed by the change type setting unit 132 and the change amount setting unit 134. The process shown in the drawings is an operation for switching the screen 112 displayed on the touch panel 110, in a case where a plurality of images 112 (for example, photos) is displayed on the touch panel 110.

The display order of the plurality of images is set in advance. Then, the touch panel 110 displays only a part of the plurality of images 112. In this case, when the user intends to display other images on the touch panel 110, the user of the electronic device moves the thumb 50 and other fingers 52 (for example, an index finger and a middle finger) in the same direction. In a case where such operation is performed on the touch panel 110, the control setting unit 130 changes the image displayed on the touch panel 110 to the previous (or next) image of the currently displayed image.

Figure 9:
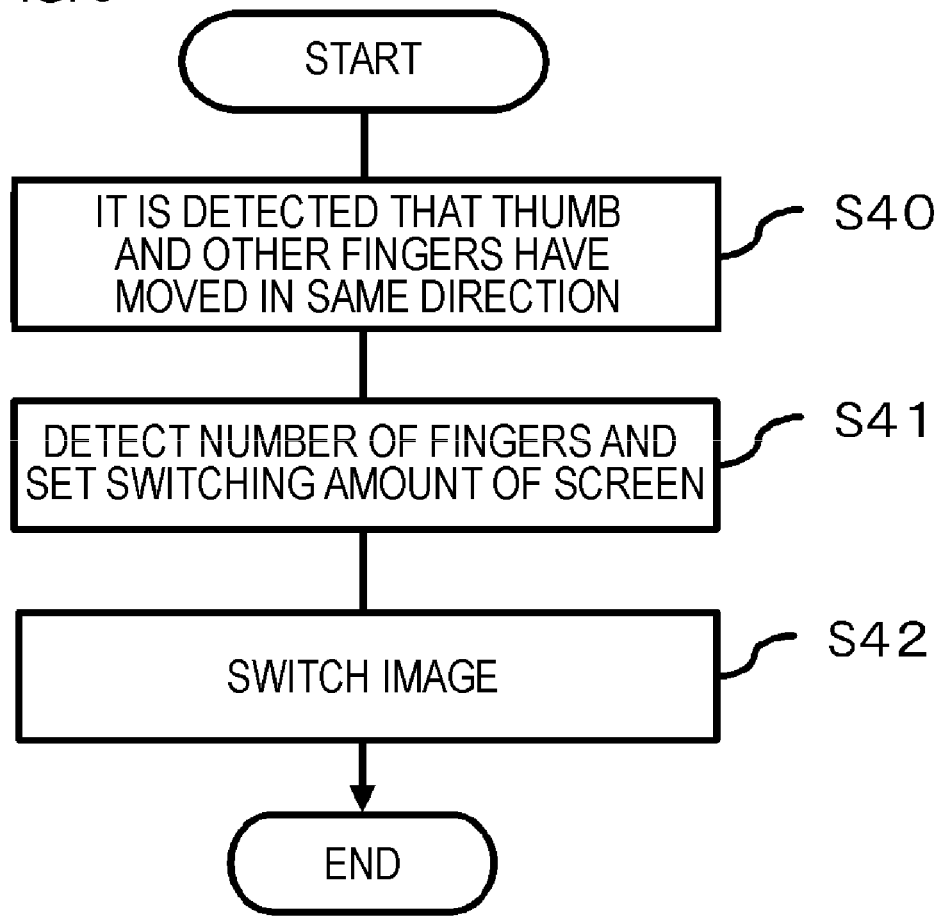
FIG. 9 is a flow chart illustrating the details of the process shown in FIG. 8.

FIG. 9 is a flow chart illustrating the details of the process shown in FIG. 8. First, the change type setting unit 132 detects that the thumb 50 and other fingers 52 were positioned on a certain image 112 and then has moved in the same direction (step S40). Therefore, the change type setting unit 132 selects a process to change the displayed image as a screen change type. Next, the change amount setting unit 134 recognizes the total number of the thumb 50 and other fingers 52, and sets a switching amount of the image (the number of return or progress) according to the recognized number (step S41). Specifically, the larger the recognized number is, the larger the change amount setting unit 134 sets the number of return or progress of the image to be. For example, the change amount setting unit 134 sets the switching amount such that the second previous (or the second next) image 112 is displayed in a case where the number of the fingers is two, and the change amount setting unit 134 sets the switching amount such that the third previous (or the third next) image 112 is displayed in a case where the number of the fingers is three.

Next, screen setting unit 140 switches the image displayed on the touch panel 110 according to the switching amount that is set by the change amount setting unit 134 (step S42).

FIG. 10 is a schematic diagram illustrating a fifth example of the control that is performed by the change type setting unit 132 and the change amount setting unit 134. The process shown in the drawings is an operation for switching hierarchies of folders displayed on the touch panel 110.

That is, in the present exemplary embodiment, the electronic device stores data in a folder format having a plurality of hierarchical structures as shown in FIG. 10(*b*). Then, the touch panel 110 displays a folder 200 positioned in a first hierarchy. The folder 200 has folders 212 and 214 at one lower hierarchy. Further, the folder 212 has folders 222 and 224 at one lower hierarchy. In this case, the user of the electronic device stops the thumb 50 and other fingers 52 on the display position of the folder 200 for a predetermined time or more. At this time, in a case where any one finger is positioned on the display position of the folder 200, the remaining fingers may not be positioned on the folder 200. In a case where such operation is performed to the touch panel 110, the control setting unit 130 switches the folder displayed on the touch panel 110 into the folder in a lower hierarchy of the folder 200.

Figure 11:
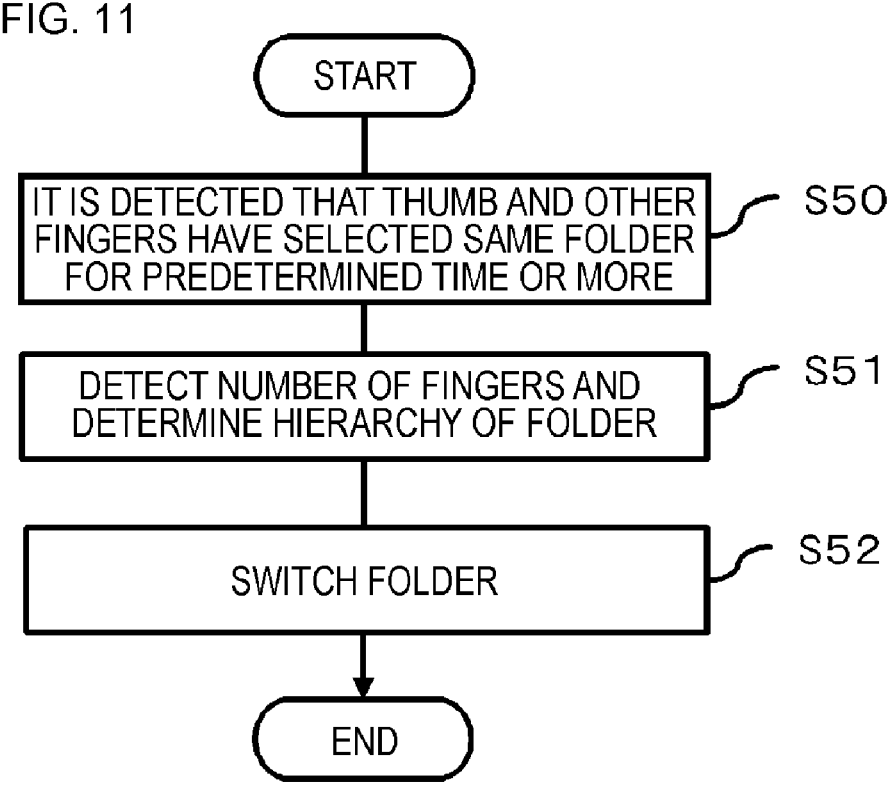
FIG. 11 is a flow chart illustrating the details of the process shown in FIG. 10.

FIG. 11 is a flow chart illustrating the details of the process shown in FIG. 10. First, the change type setting unit 132 detects that the thumb 50 and other fingers 52 have stopped on the folder 200 for a predetermined time or more (step S50). Therefore, the change type setting unit 132 selects a process to switch the hierarchy of a folder, as a screen change type. Next, the change amount setting unit 134 recognizes the total number of the thumb 50 and other fingers 52, and sets a switching number of the hierarchy of the folder according to the recognized number (step S51). Specifically, the larger the recognized number is, the larger the change amount setting unit 134 sets the switching number of the hierarchy of a folder to be. For example, the change amount setting unit 134 sets such that the folder positioned in two lower or two upper hierarchy is displayed in a case where the number of the fingers is two. Here, it is predetermined whether to proceed to the upper hierarchy or to proceed to the lower hierarchy.

In a case of switching the displayed folder to the lower folder, a plurality of folders may exist in one lower hierarchy. In this case, the change amount setting unit 134 selects one folder among a plurality of folders according to the predetermined rule. Here, as the rule, it is considered to select, for example, a folder the update date of which is the latest.

Then, the screen setting unit 140 switches the hierarchy of the folder displayed on the touch panel 110 according to the proceeding amount that is set by the change amount setting unit 134 (step S52).

In addition, in each example described above, the change amount setting unit 134 may set the change amount to maximum, when the number of the detected finger is the predetermined number (for example, 5) or more. For example, in a case of the process shown in FIG. 2 and FIG. 3, the change amount setting unit 134 sets the enlargement factor to maximum. Further, in a case of the process shown in FIG. 4 and FIG. 5, the change amount setting unit 134 sets the enlargement factor to minimum. Further, in a case of the process shown in FIG. 6 and FIG. 7, the change amount setting unit 134 causes the screen to be scrolled to the edge. Further, in a case of the process shown in FIG. 8 and FIG. 9, the change amount setting unit 134 displays the first or last image. Further, in a case of the process shown in FIG. 10 and FIG. 11, the change amount setting unit 134 displays the folder in the top hierarchy (a desktop) or a bottom hierarchy.

Further, in each example described above, the change amount setting unit 134 may use fingers 52 other than the thumb 50. Since the thumb 50 is likely to move in the direction different from other fingers 52, the change amount setting unit 134 can distinguish the thumb 50 from other fingers 52.

As described above, according to the present exemplary embodiment, the control of the display of the touch panel is determined using the number of fingers as a new parameter. Accordingly, it is possible to enhance the convenience of the user interface in the electronic device with the touch panel.

Second Exemplary Embodiment

Figure 12:
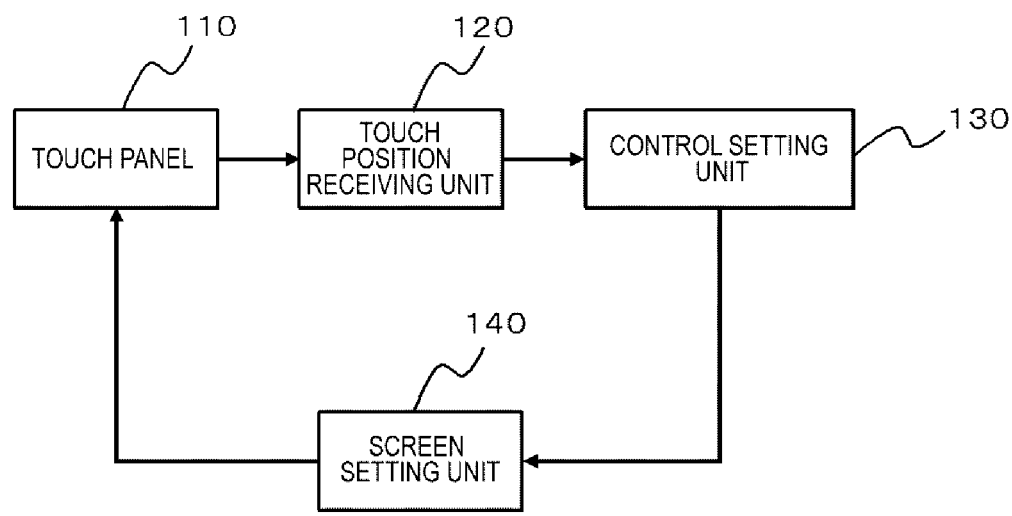
FIG. 12 is a block diagram illustrating a configuration of an electronic device relating to a second exemplary embodiment.

FIG. 12 is a block diagram illustrating a functional configuration of an electronic device of a second exemplary embodiment. The electronic device of the present exemplary embodiment is the same as the electronic device of the first exemplary embodiment except that the function of the control setting unit 130 is not divided into a change type setting unit 132 and a change amount setting unit 134.

Figure 13:
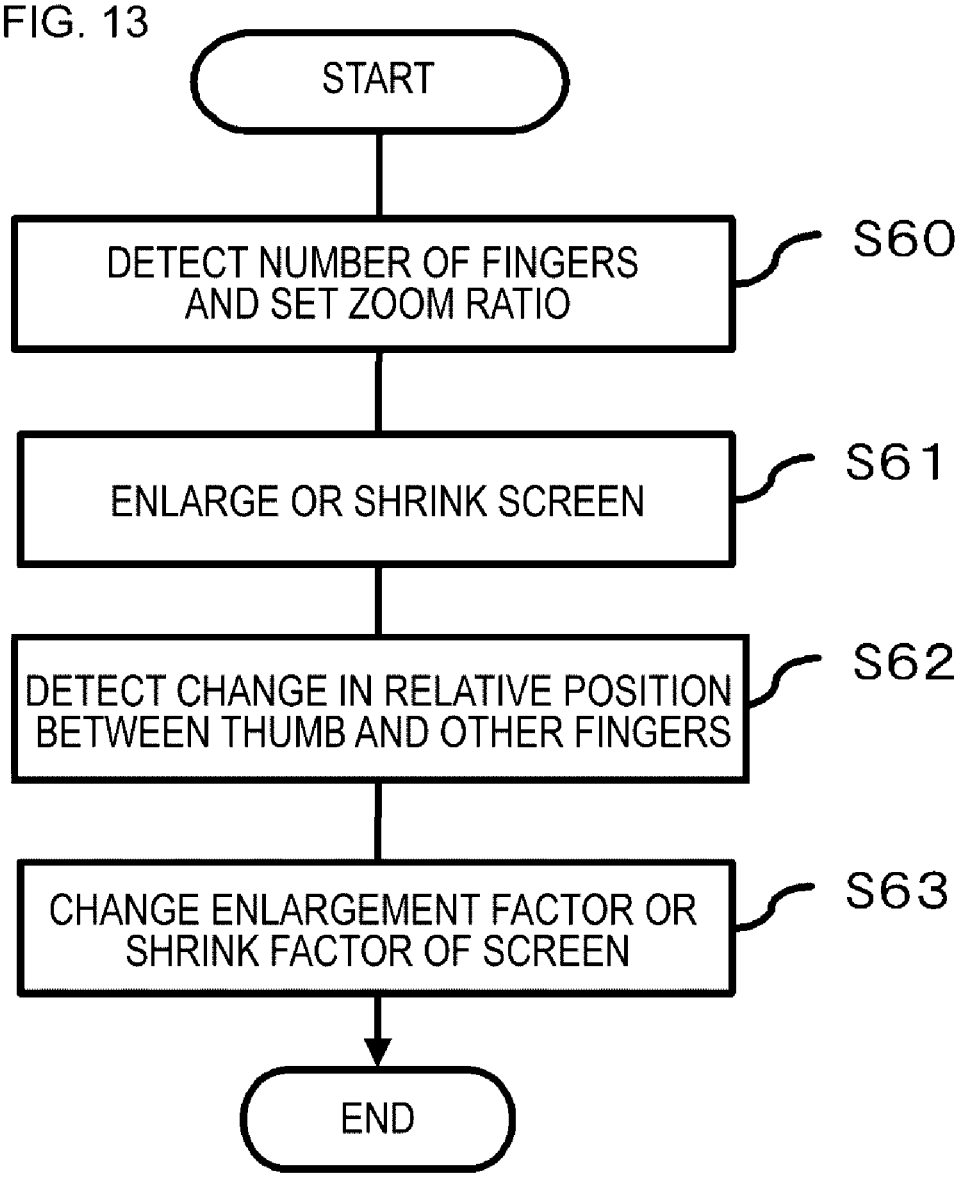
FIG. 13 is a flow chart illustrating a first control that is performed by the control setting unit shown in FIG. 12.

FIG. 13 is a flow chart illustrating a first control that is set by the control setting unit 130 shown in FIG. 12. In the present exemplary embodiment, the control setting unit 130 sets a zoom ratio of a screen based on the number of fingers, and changes the zoom ratio of the screen based on the change in the relative position of fingers.

First, the control setting unit 130 recognizes the number of the thumb 50 and other fingers 52, and sets the zoom ratio according to the recognized number (step S60). For example, the control setting unit 130 sets the enlargement factor to 200% in a case where the number of fingers is two, and sets the enlargement factor to 300% in a case where the number of fingers is three. Next, the screen setting unit 140 causes a screen to be displayed on the touch panel 110 according to the zoom ratio that is set by the control setting unit 130 (step S61).

Next, the control setting unit 130 detects that the user of the electronic device changes the distance between the thumb 50 and other fingers 52 (step S62). Then, the control setting unit 130 changes the zoom ratio of the screen. For example, in a case where the distance between the thumb 50 and other fingers 52 becomes larger, the control setting unit 130 further increases the zoom ratio. In contrast, in a case where the distance between the thumb 50 and other fingers 52 becomes smaller, the control setting unit 130 reduces the zoom ratio. The screen setting unit 140 causes the screen to be displayed on the touch panel 110 according to the changed zoom ratio (step S63).

Figure 14:
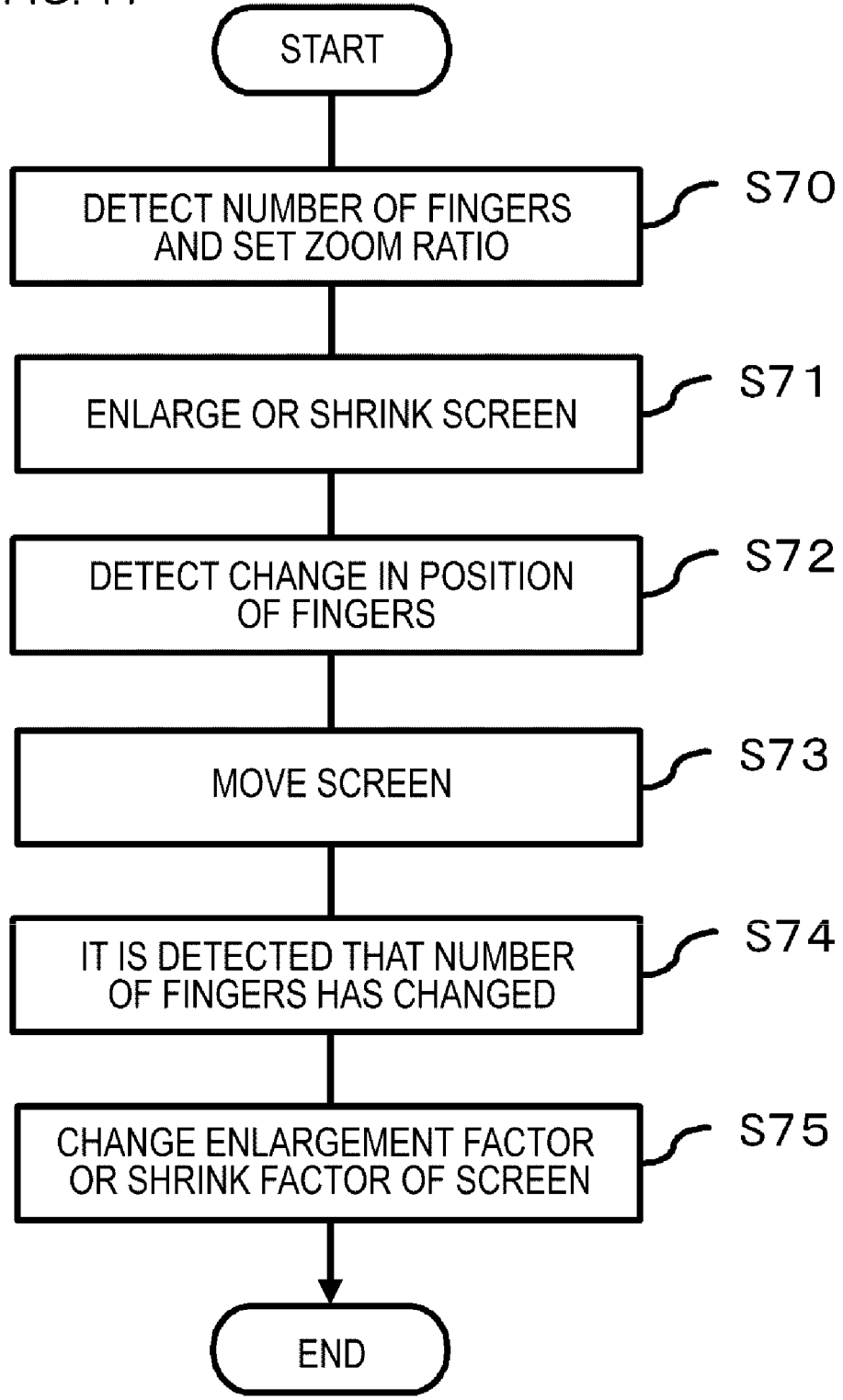
FIG. 14 is a flow chart illustrating a second control that is performed by the control setting unit shown in FIG. 12.

FIG. 14 is a flow chart illustrating the second control that is performed by the control setting unit 130 shown in FIG. 12. In the present exemplary embodiment, the control setting unit 130 determines the zoom ratio of the screen based on the number of fingers, and causes the screen to be scrolled based on the change in the position of fingers.

First, the control setting unit 130 recognizes the number of the thumb 50 and other fingers 52, and sets the shrink factor of the screen according to the recognized number (step S70). For example, the control setting unit 130 sets the factor to 50% in a case where the number of fingers is two, and sets the factor to 33% in a case where the number of fingers is three. Next, the screen setting unit 140 causes a screen to be displayed on the touch panel 110 according to the zoom ratio that is set by the control setting unit 130 (step S71).

Next, the control setting unit 130 detects that the user of the electronic device moves the thumb 50 and other fingers 52 in the same direction (step S72). Then, the control setting unit 130 causes the screen to be scrolled in the direction that the thumb 50 and other fingers 52 move (step S73).

Next, the user changes the number of fingers touching the touch panel 110. If it is detected that the number of fingers touching the touch panel 110 has changed (step S74), the control setting unit 130 changes the shrink factor of the screen displayed on the touch panel 110, based on the changed number of fingers (step S75). For example, in a case of the total number of the thumb 50 and other fingers 52 is changed from three to one, the control setting unit 130 returns the zoom ratio from 33% to 100%.

According to the present exemplary embodiment, the control to the electronic device is determined using the number of fingers as the new parameter. Therefore, it is possible to enhance the convenience of the user interface in the electronic device with the touch panel.

Third Exemplary Embodiment

Figure 15:
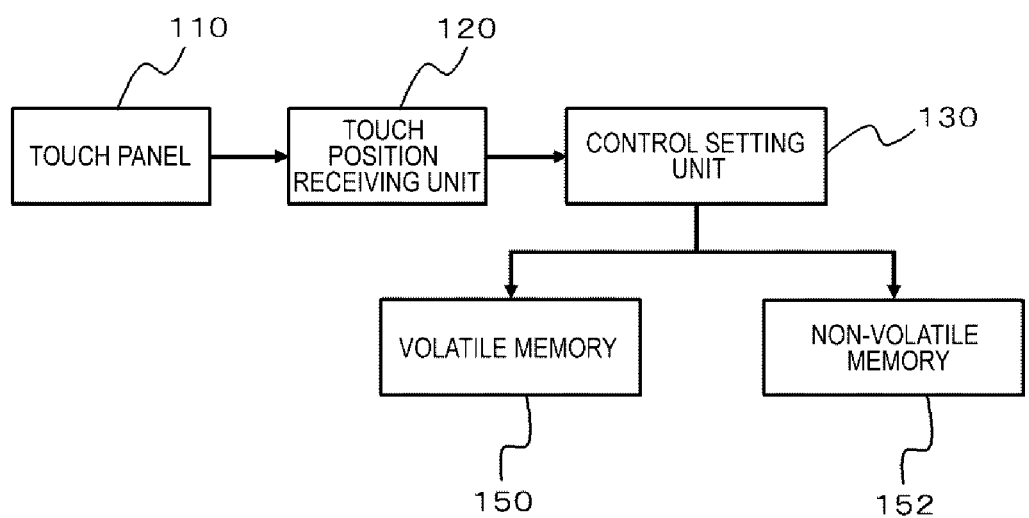
FIG. 15 is a block diagram illustrating a functional configuration of an electronic device relating to a third exemplary embodiment.

FIG. 15 is block diagram illustrating a functional configuration of an electronic device of third exemplary embodiment. An electronic device of the exemplary embodiment includes a volatile memory 150 and a non-volatile memory 152 as a memory. Then, the control setting unit 130 selects a memory as a destination memory in response to the number of fingers, when the displayed data on a touch panel 110 is stored to a memory.

Figure 16:
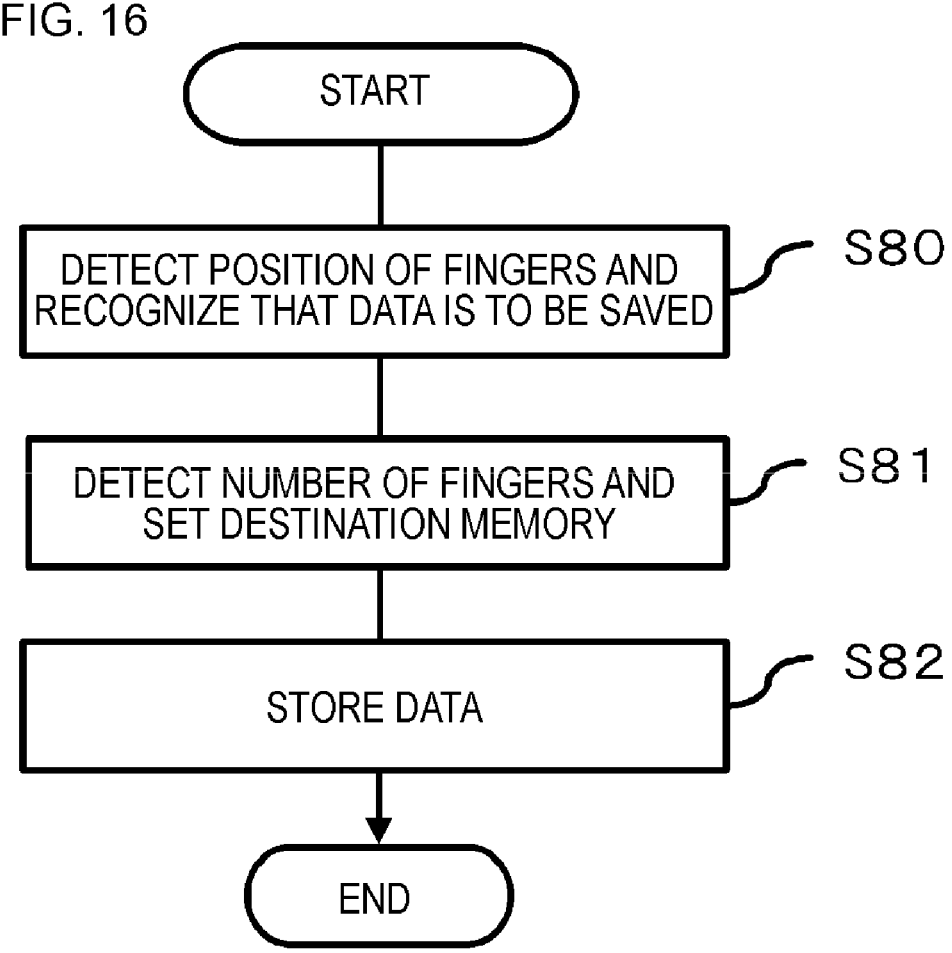
FIG. 16 is a flow chart illustrating a process that is performed by the control setting unit shown in FIG. 15.

FIG. 16 is a flow chart illustrating a process performed by the control setting unit 130 shown in FIG. 15. First, in a case where data is opened in an editable format on the touch panel 110 and the user's finger is positioned on the icon indicating a save process, the control setting unit 130 recognizes that the data that is being opened has to be saved (step S80). Next, the control setting unit 130 determines the destination memory by recognizing the number of the user's finger (step S81). For example, the control setting unit 130 selects the volatile memory 150 as the destination memory when the number of the user's finger is one, and selects the non-volatile memory 152 as the destination memory when the number of the user's finger is two. Next, the control setting unit 130 stores the data that is being edited to the selected memory (step S82).

In addition, in the present exemplary embodiment, the electronic device may have a hard disk instead of the non-volatile memory 152. Further, the electronic device may have the functions shown in any one of the first and second exemplary embodiments.

According to the present exemplary embodiment, it is possible to select the destination memory according to the number of fingers touching the touch panel 110. Therefore, it is possible to enhance the convenience of the user interface.

Fourth Exemplary Embodiment

Figure 17:
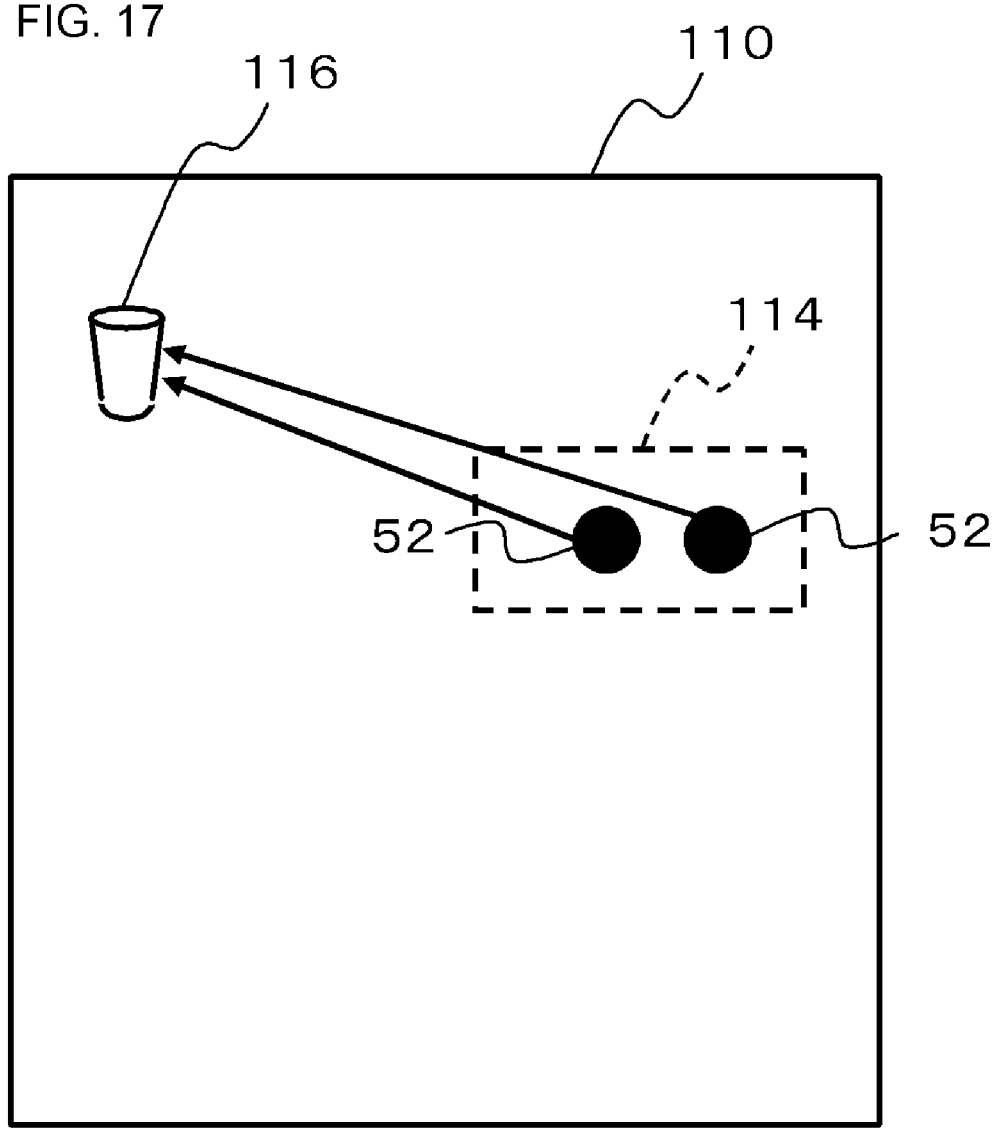
FIG. 17 is a block diagram illustrating a functional configuration of an electronic device relating to a fourth exemplary embodiment.

FIG. 17 is block diagram illustrating a functional configuration of an electronic device of the fourth exemplary embodiment. The electronic device of the present exemplary embodiment has a non-volatile memory or a hard disk, and displays a trash folder 116 and data 114 on the touch panel 110. The data 114 is displayed, for example, in an icon format. Then, the control setting unit 130 performs a process to erase the data 114 from the desktop, when fingers slide from above the data 114 to above the trash folder 116. Here, the control setting unit 130 sets the erase level of the data 114 according to the number of fingers.

FIG. 18 is a flowchart illustrating details of a process shown in FIG. 17. First, the control setting unit 130 recognizes the position of the user's fingers, whereby recognizes the data 114 to be processed (step S90). Next, when the user's fingers slide from above the data 114 to above the trash folder 116, the control setting unit 130 recognizes that the movement destination of the data 114 is the trash folder 116 (step S91). Next, the control setting unit 130 recognizes the number of the user's fingers, whereby sets the erase level of the data 114. For example, in a case where the number of the user's finger is one, the control setting unit 130 moves the data 114 to the trash folder 116 and terminates the process. Further, in a case where the number of the user's finger is two, the control setting unit 130 moves data 114 to the trash folder 116 and erases the data 114 from the non-volatile memory or the hard disk (step S92). Next, the control setting unit 130 processes the data 114 stored in the non-volatile memory or the hard disk according to the erase level that is set (step S93).

According to the present exemplary embodiment, it is possible to select the erase level of data 114 according to the number of fingers touching the touch panel 110. Therefore, it is possible to enhance the convenience of the user interface. In addition, the electronic device may have the function shown in any one of the first to third exemplary embodiments.

As described above, the exemplary embodiments of the present invention have been described referring to drawings, but the exemplary embodiments are only examples of the present invention, and various configurations other than the above exemplary embodiments can be adopted.

This application claims a priority to Japanese Patent Application No. 2011-33781 filed on Feb. 18, 2011, and the entire disclosure thereof is incorporated herein.

The invention claimed is:

1. An electronic device comprising:
   a touch position receiving unit which receives, from a touch panel, touch position information indicating each of touch positions of a first object and at least one of second objects with respect to the touch panel for each object, the second object being different from the first object;
   a change type setting unit which calculates a movement direction of each of the first object and the second object based on the touch position information, and determines a change type of a display of the touch panel based on the movement direction; and
   a change amount setting unit which recognizes the number of the second objects based on the touch position information, and sets a change amount of the display based as a value corresponding to the number of the second objects,
   wherein the change amount of the display corresponding to the first number of the second objects is greater than the change amount of the display corresponding to a second number of the second objects, the first number of the second objects being greater than the second number of the second objects,
   wherein a display of the touch panel is changed in accordance with the change amount of the display determined by the change amount setting unit and the change type of a display of the touch panel determined by the change type setting unit,
   wherein the electronic device stores data in a folder format with a plurality of hierarchical structures, wherein the touch panel displays a first folder positioned in a first hierarchy,
wherein the change type setting unit changes the hierarchy of the folder to be displayed on the screen, and
wherein the change amount setting unit determines the change amount of the hierarchy based on the number of the second objects.

2. The electronic device according to claim 1, wherein the change type setting unit determines the change type based on the change in a relative position of the second object with respect to the first object, the change in the relative position being calculated based on the touch position information of the first object and the touch position information of the second object.

3. The electronic device according to claim 2, wherein the number of the first object is one, the number of the second objects is plural, and a plurality of the second objects move in the same direction each other.

4. The electronic device according to claim 2, wherein based on a change amount of the relative position between the first object and the second object, the change amount setting unit further determines the change amount.

5. The electronic device according to claim 2, wherein the change type setting unit enlarges and displays a screen when a distance from the first object to the second object has been increased.

6. The electronic device according to claim 5, wherein the change amount setting unit increases an enlargement factor of the screen as the number of the second objects is increased.

7. The electronic device according to claim 2, wherein the change type setting unit shrinks and displays the screen when the distance from the first object to the second object has been decreased.

8. The electronic device according to claim 7, wherein the change amount setting unit increases an shrink factor of the screen as the number of the second objects is increased.

9. The electronic device according to claim 1, wherein the change amount setting unit causes the screen to be scrolled in a movement direction of the second object.

10. The electronic device according to claim 9, wherein the change amount setting unit increases a scroll amount of the screen as the number of the second objects is increased.

11. The electronic device according to claim 1, wherein a plurality of images, orders of which are predetermined, are displayed in a set order on the touch panel, and p1 wherein the change type setting unit switches an image that is being displayed to a previous- or next-image of the image.

12. The electronic device according to claim 11, wherein the change amount setting unit increases a return number or a progress number of the image as an amount of the touch position information is increased.

13. The electronic device according to claim 1, wherein the change amount setting unit maximizes the change amount when the number of the second objects is equal to or larger than a predefined number.

14. The electronic device according to claim 1, wherein in a case where the number of the second objects is changed after the change amount is determined, the change amount setting unit changes the change amount using the changed number of the second objects.

15. The electronic device according to claim 1, further comprising a control setting unit which determines control over the electronic device based on the number of the second objects, when it is determined that the first object moves in a direction different from the second object,
wherein the control setting unit determines a zoom ratio of a screen to be displayed on the touch panel based on the number of the second object, and changes the zoom ratio of the screen based on a change in a relative position of the first object and the second object, the zoom ratio being determined as a value corresponding to the number of the second object.

16. The electronic device according to claim 15, further comprising a control setting unit which determines control over the electronic device based on the number of the second objects, when it is determined that the first object moves in a direction different from the second object,
wherein the touch panel is provided in the electronic device,
wherein the electronic device displays a trash folder and an icon indicating data on the touch panel,
wherein the control setting unit moves the data to the trash folder and does not erase the data from a storage medium storing the data when the first object moves to the trash folder while selecting the icon, and
wherein the control setting unit erases the data from the storage medium storing the data when the first object and at least one of the second objects moves to the trash folder while selecting the icon.

17. The electronic device according to claim 1, further comprising a control setting which determines control over the electronic device based on the number of second object, when it is determined that the first object moves in a direction different from the second object,
wherein the control setting unit determines a zoom ratio of a screen to be displayed on the touch panel based on the number of the second object, and determines a movement direction of the screen based on a movement direction of the second object, the zoom ratio being determined as a value corresponding to the number of the second object and not corresponding to the distance between the first object and the second object.

18. The electronic device according to claim 1, further comprising the touch panel.

19. A control setting method of a display of a touch panel which is implemented by a computer comprising:
receiving, from a touch panel, touch position information indicating each of touch positions of a first object and at least one of the second objects with respect to the touch panel for each object, the second object being different from the first object;
calculating a movement direction of each of the first object and the second object based on the touch position information, and determining a change type of a display of the touch panel based on the movement direction; and
recognizing a number of the second objects based on the touch position information, and setting a change amount of the display as a value corresponding to the number of the second objects,
wherein the change amount of the display corresponding to a first number of the second object is greater than the change amount of the display corresponding to a second number of the second objects, the first number of the second objects being greater than the second number of the second objects, wherein a display of the touch panel is changed in accordance with the change amount of the display and the change type of a display of the touch panel, wherein the touch panel stores data in a folder format with a plurality of hierarchical structures, wherein the touch panel displays a first folder positioned in a first hierarchy, wherein the determining the change type comprises changing the hierarchy of the folder to be displayed on the display, and wherein the setting the change amount comprises determining the change amount of the hierarchy based on the number of the second objects.

20. A non-transitory computer-readable storage medium including a program which causes a computer to function as an electronic device which controls a display of a touch panel, the program causing the computer to execute:

receiving, from a touch panel, touch position information indicating each of touch positions of a first object and at least one of the second objects with respect to the touch panel for each object, the second object being different from the first object;

calculating a movement direction of each of the first object and the second object based on the touch position information, and determining a change type of a display of the touch panel based on the movement direction; and recognizing the number of the second objects based on the touch position information, and setting a change amount of the display based on the number, wherein the change amount of the display corresponding to a first number of the second objects is greater than the change amount of the display corresponding to a second number of the second objects, the first number of the second objects being greater than the second number of the second objects, wherein a display of the touch panel is changed in accordance with the change amount of the display and the change type of a display of the touch panel, wherein the touch panel stores data in a folder format with a plurality of hierarchical structures, wherein the touch panel displays a first folder positioned in a first hierarchy, wherein the determining the change type comprises changing the hierarchy of the folder to be displayed on the display, and wherein the setting the change amount comprises determining the change amount of the hierarchy based on the number of the second objects.

21. An electronic device comprising:

a touch position receiving unit which receives, from a touch panel, touch position information indicating each of touch positions of a first object and at least one of the second objects with respect to the touch panel for each other, the second object being different from the first object;

a change type setting unit which calculates a movement direction of each of the first object and the second object based on the touch position information, and determines a change type of a display of the touch panel based on the movement direction; and a control setting unit which determines control over the electronic device based on a number of the second objects, when it is determined that the first object moves in a direction different from the second object, wherein the touch panel is provided in the electronic device, wherein the electronic device has a volatile memory, a non-volatile memory, or a hard disk, and wherein when the movement direction of the second object satisfies a condition, the control setting unit saves data and determines where to store the data in the volatile memory, the non-volatile memory, or the hard disk, in response to the number of the second objects.

* * * * *

UNITED STATES PATENT AND TRADEMARK OFFICE
CERTIFICATE OF CORRECTION

PATENT NO. : 9,594,432 B2
APPLICATION NO. : 13/985976
DATED : March 14, 2017
INVENTOR(S) : Hiroyasu Kuramatsu Page 1 of 1

It is certified that error appears in the above-identified patent and that said Letters Patent is hereby corrected as shown below:

In the Claims

Claim 11, Column 11, Line 52:
"and p1 wherein" should be replaced with --and wherein--;

Claim 17, Column 12, Line 32:
After "control setting" insert --unit--;

Claim 21, Column 14, Line 17:
"other" should be replaced with --object--.

Signed and Sealed this
Thirteenth Day of February, 2018

Andrei Iancu
*Director of the United States Patent and Trademark Office*